(12) United States Patent
Saito et al.

(10) Patent No.: US 10,843,483 B2
(45) Date of Patent: Nov. 24, 2020

(54) INK JET RECORDING METHOD AND INK JET RECORDING APPARATUS

(71) Applicant: CANON KABUSHIKI KAISHA, Tokyo (JP)

(72) Inventors: Hideyuki Saito, Saitama (JP); Kouhei Nakagawa, Tokyo (JP); Yoshihide Aikawa, Kawasaki (JP); Minako Kawabe, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/158,404

(22) Filed: Oct. 12, 2018

(65) Prior Publication Data

US 2019/0111702 A1 Apr. 18, 2019

(30) Foreign Application Priority Data

Oct. 17, 2017 (JP) .................................. 2017-201262
Sep. 26, 2018 (JP) .................................. 2018-180353

(51) Int. Cl.
*B41J 2/21* (2006.01)
*B41J 2/17* (2006.01)
(Continued)

(52) U.S. Cl.
CPC ................. *B41J 2/211* (2013.01); *B41J 2/17* (2013.01); *C09D 11/322* (2013.01); *C09D 11/40* (2013.01); *B41J 2/16588* (2013.01)

(58) Field of Classification Search
CPC ........ B41J 2/1433; B41J 2/161; B41J 2/1623; B41J 2202/00; B41J 2202/03; B41J 2/14201; B41J 2/045; B41J 2/04588; B41J 2/04595; B41J 2/04586; B41J 2/14274; B41J 11/0015; B41J 11/002; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41M 5/0011; B41M 5/0017; B41M 5/0047; B41M 7/00;
(Continued)

(56) References Cited

U.S. PATENT DOCUMENTS 7,208,033 B2   4/2007   Kawabe et al.
7,244,299 B2   7/2007   Tsuji et al.
(Continued)

FOREIGN PATENT DOCUMENTS

JP   2005-342982 A   12/2005
JP   2008-023989 A   2/2008

*Primary Examiner* — Manish S Shah
(74) *Attorney, Agent, or Firm* — Venable LLP

(57) ABSTRACT

A ink jet recording method, which uses an ink jet recording apparatus including: first and second inks each containing a coloring material; and a recording head having an ejection orifice surface in which a first ejection orifice array for ejecting the first ink and a second ejection orifice array for ejecting the second ink are formed, the first and second ejection orifice arrays being sequentially arranged from the bottom in the direction of gravity to be adjacent to each other and at least partially overlap each other, includes recording, wherein at least one of the first and second inks contains a resin, and a content of the resin in the second ink is smaller than a content of the resin in the first ink.

14 Claims, 5 Drawing Sheets

(51) Int. Cl.
*C09D 11/322* (2014.01)
*B41J 2/165* (2006.01)
*C09D 11/40* (2014.01)

(58) Field of Classification Search
CPC .... B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
See application file for complete search history.

(56) References Cited

U.S. PATENT DOCUMENTS

| | | |
|---|---|---|
| 7,285,159 B2 | 10/2007 | Aikawa et al. |
| 7,294,184 B2 | 11/2007 | Fujimoto et al. |
| 7,445,325 B2 | 11/2008 | Aikawa et al. |
| 7,615,113 B2 | 11/2009 | Aikawa et al. |
| 7,618,484 B2 | 11/2009 | Fujimoto et al. |
| 7,705,071 B2 | 4/2010 | Nakagawa et al. |
| 7,909,448 B2 | 3/2011 | Iwata et al. |
| 9,574,099 B2 | 2/2017 | Kawabe et al. |
| 9,605,170 B2 | 3/2017 | Nakagawa et al. |
| 2012/0218335 A1* | 8/2012 | Kondo .................. B41J 2/2132 347/13 |
| 2014/0240393 A1* | 8/2014 | Mukai .................... B41J 2/2107 347/28 |
| 2017/0165979 A1* | 6/2017 | Ohta ....................... B41M 7/009 |
| 2017/0232750 A1* | 8/2017 | Takino ................ B41J 2/16535 347/33 |

\* cited by examiner

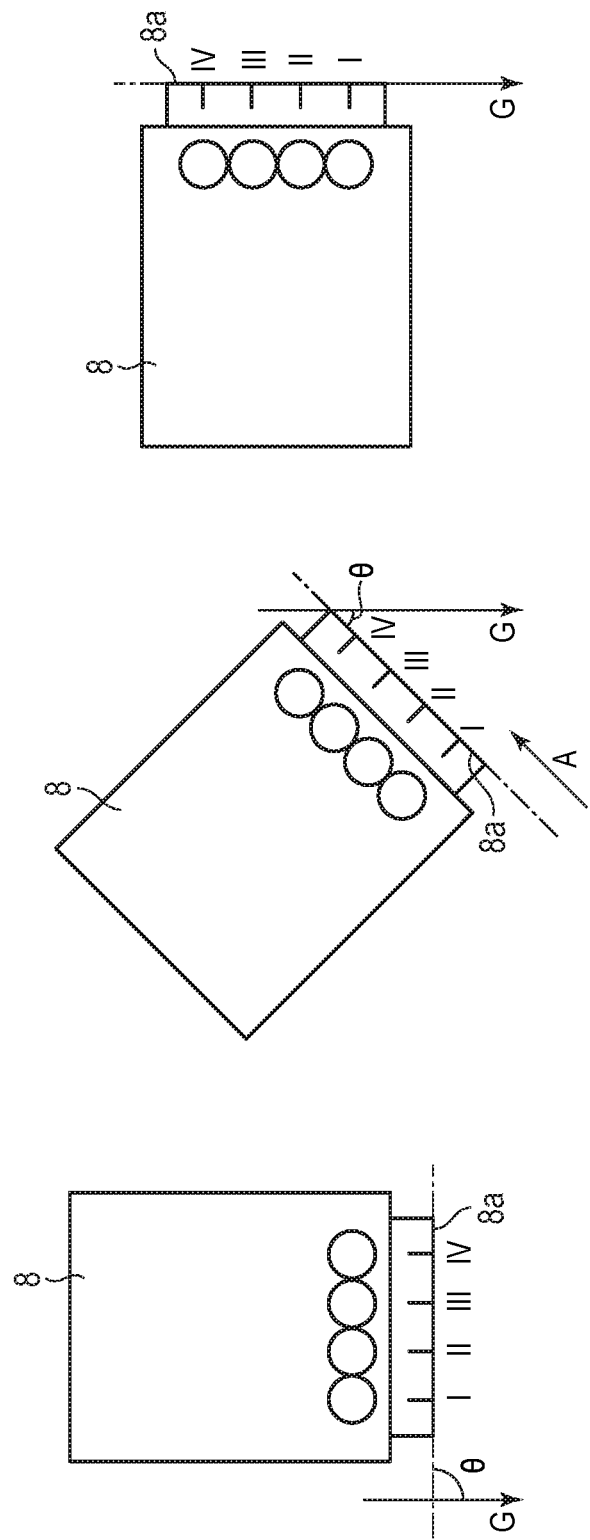

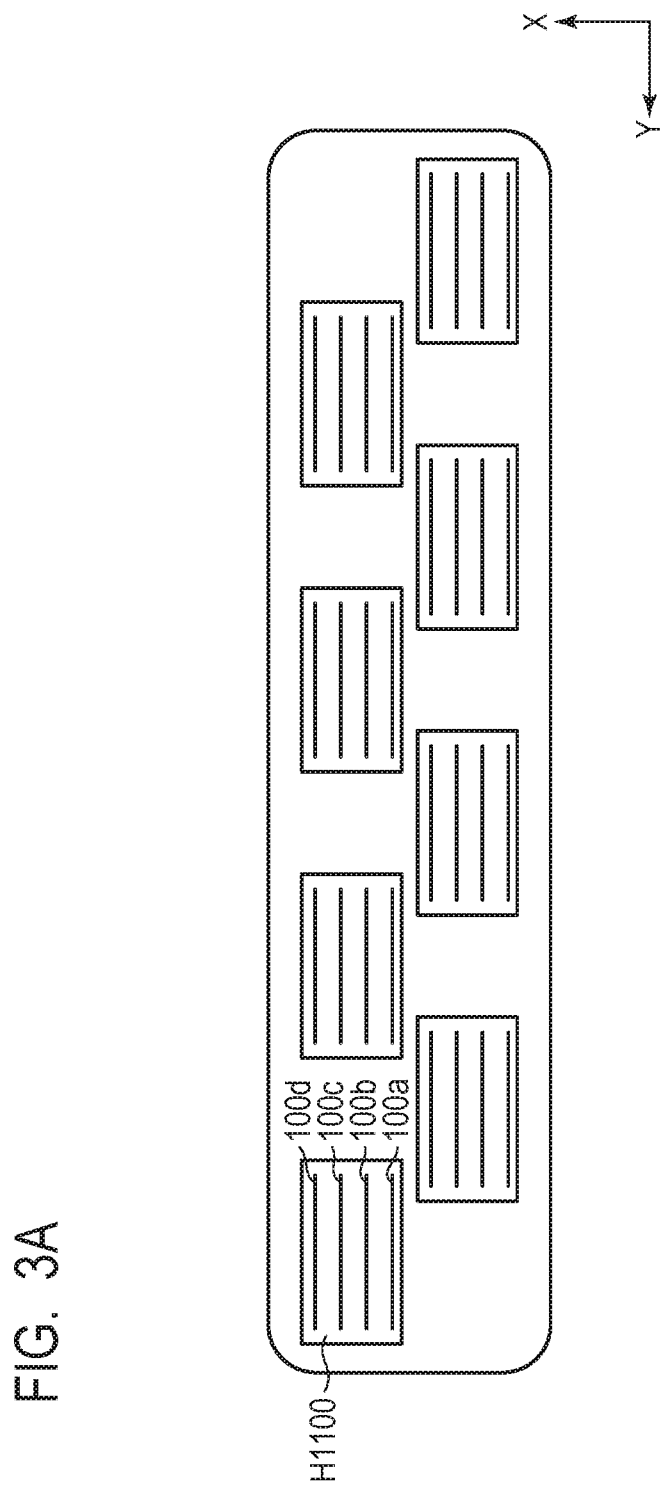

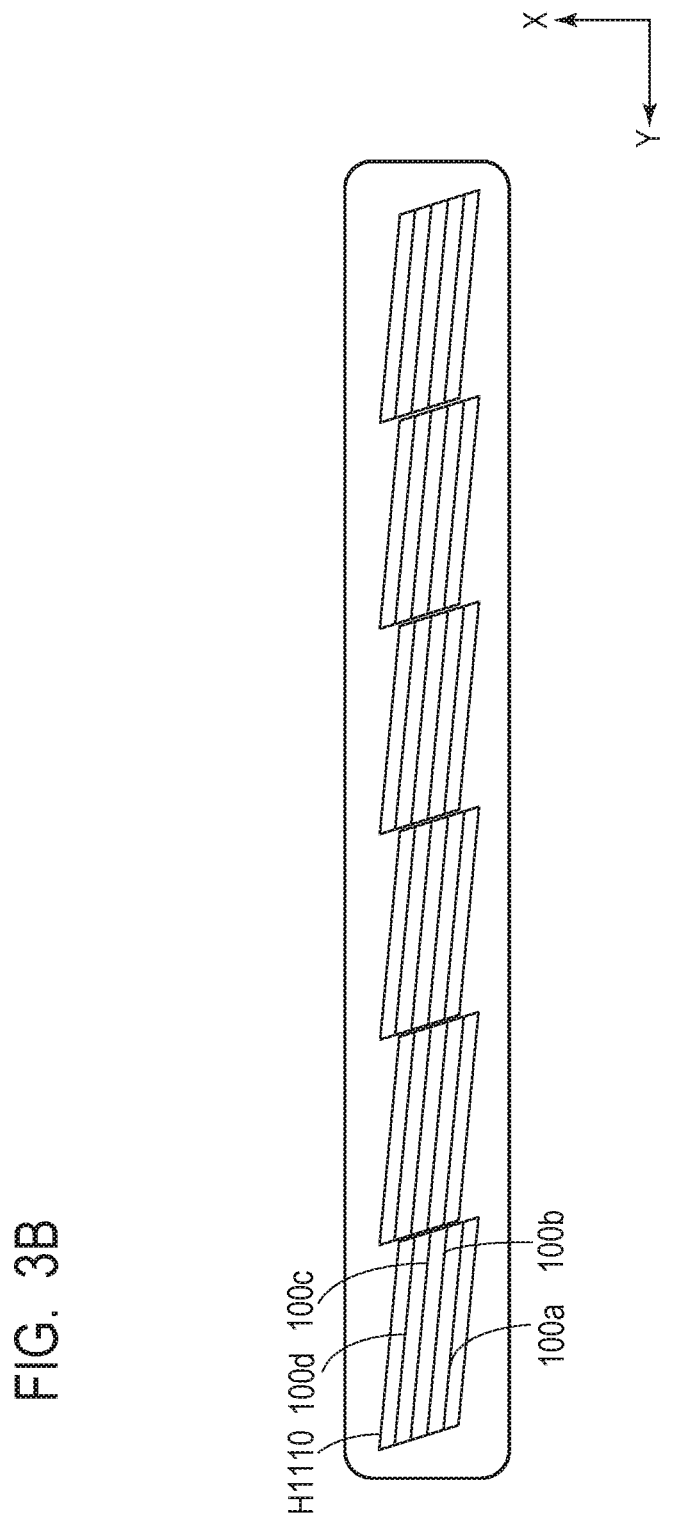

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

Recently, an opportunity to use an ink jet recording apparatus in a commercial printing field and an office printing field has increased. In the commercial printing field and the office printing field, miniaturization of the ink jet recording apparatus is required. In order to miniaturize the apparatus, it has been studied to shorten a conveying distance of a recording medium by using a recording head in which an ejection orifice surface of the recording head is inclined with respect to the direction of gravity (see Japanese Patent Application Laid-Open No. 2005-342982). Further, it has been studied to use a recording head having a plurality of ejection orifice arrays for ejecting a plurality of inks instead of using a plurality of recording heads corresponding to a plurality of inks of colors such as cyan, magenta, yellow, and black (see Japanese Patent Application Laid-Open No. 2008-023989).

A study was conducted by the present inventors using a recording head having the plurality of ejection orifice arrays for ejecting the plurality of inks while an ejection orifice surface of the recording head was inclined with respect to the direction of gravity. As a result, it was found that, when ink is ejected from the recording head, color mixing may occur in an image to be recorded.

SUMMARY OF THE INVENTION

An object of the present invention is to provide an ink jet recording method capable of suppressing color mixing in an image even in the case in which ink is ejected from a recording head inclined with respect to the direction of gravity and having a plurality of ejection orifice arrays for ejecting a plurality of inks. Another object of the present invention is to provide an ink jet recording apparatus using the ink jet recording method as described above.

According to an embodiment of the present invention, there is a provided an ink jet recording method using an ink jet recording apparatus including: first and second inks corresponding to aqueous inks each containing a coloring material; and a recording head having an ejection orifice surface in which a first ejection orifice array for ejecting the first ink and a second ejection orifice array for ejecting the second ink are formed, the first and second ejection orifice arrays being sequentially arranged from the bottom in the direction of gravity to be adjacent to each other and at least partially overlap each other in a conveying direction of a recording medium, the ink jet recording method including: ejecting the aqueous ink from the recording head disposed so that an angle formed between the ejection orifice surface of the recording head and the direction of gravity is 0° or more to less than 90° to record an image on the recording medium, wherein at least one of the first and second inks contains a resin, and a content of the resin in the second ink is smaller than that in the first ink.

According to another embodiment of the present invention, there is a provided an ink jet recording apparatus including: first and second inks corresponding to aqueous inks each containing a coloring material; and a recording head having an ejection orifice surface in which a first ejection orifice array for ejecting the first ink and a second ejection orifice array for ejecting the second ink are formed, the first and second ejection orifice arrays being sequentially arranged from the bottom in the direction of gravity to be adjacent to each other and at least partially overlap each other in a conveying direction of a recording medium, wherein an image is recorded on the recording medium by ejecting the aqueous ink from the recording head disposed so that an angle formed between the ejection orifice surface of the recording head and the direction of gravity is 0° or more to less than 90°, at least one of the first and second inks contains a resin, and a content of the resin in the second ink is smaller than a content of the resin in the first ink.

According to the present invention, it is possible to provide an ink jet recording method and an ink jet recording apparatus capable of suppressing color mixing in images even in the case in which ink is ejected from a recording head inclined with respect to the direction of gravity and having a plurality of ejection orifice arrays for ejecting a plurality of inks.

Further features of the present invention will become apparent from the following description of exemplary embodiments with reference to the attached drawings.

BRIEF DESCRIPTION OF THE DRAWINGS

FIG. 1A, which is a view illustrating a relationship between an ejection orifice surface of a recording head and the direction of gravity, is a view illustrating a case in which an angle formed between the ejection orifice surface of the recording head and the direction of gravity is 90°.

FIG. 1B, which is a view illustrating a relationship between the ejection orifice surface of the recording head and the direction of gravity, is a view illustrating a case in which the angle formed between the ejection orifice surface of the recording head and the direction of gravity is about 45°.

FIG. 1C, which is a view illustrating a relationship between the ejection orifice surface of the recording head and the direction of gravity, is a view illustrating a case in which the angle formed between the ejection orifice surface of the recording head and the direction of gravity is 0°.

FIG. 3A, which is a view schematically illustrating an example of a line head, is a schematic view of a line head in which the recording element substrates are arranged in a zigzag shape (non-adjacent arrangement) in an arrangement direction of a plurality of ejection orifice arrays.

FIG. 3B, which is a view schematically illustrating an example of a line head, is a schematic view of a line head in which the recording element substrates are arranged in a linear shape (adjacent arrangement) in an arrangement direction of a plurality of ejection orifice arrays.

DESCRIPTION OF THE EMBODIMENTS

Figure 2A:
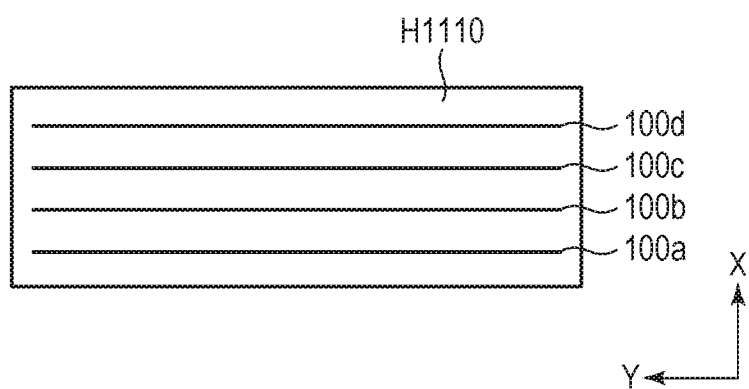
FIG. 2A, which is a view for explaining an example of the recording head, is a schematic view of a recording element substrate.

Hereinafter, embodiments of the present invention are described in detail. In the present invention, hereinafter, in some cases, an aqueous ink is referred to as an "ink". Unless otherwise specified, various physical property values are values at a temperature of 25° C. "(Meth)acrylic acid" and "(meth)acrylate" are described as "acrylic acid and methacrylic acid" and "acrylate and methacrylate", respectively.

FIGS. 1A to 1C are views illustrating a relationship between an ejection orifice surface of a recording head and the direction of gravity, wherein FIG. 1A is a view illustrating a case in which an angle formed between the ejection orifice surface of the recording head and the direction of gravity is 90°, FIG. 1B is a view illustrating a case in which the angle formed between the ejection orifice surface of the recording head and the direction of gravity is about 45°, and FIG. 1C is a view illustrating a case in which the angle formed between the ejection orifice surface of the recording head and the direction of gravity is 0°. In FIGS. 1A to 1C, θ represents the angle formed between an ejection orifice surface 8a of a recording head 8 and the direction of gravity (arrow G in FIGS. 1A to 1C). In a general ink jet recording method, as illustrated in FIG. 1A, ink is ejected from a recording head 8 having the ejection orifice surface 8a at an angle of 90° with respect to the direction of gravity, that is, the ejection orifice surface 8a is substantially perpendicular to the direction of gravity, such that an image is recorded. However, in an ink jet recording method according to the present invention, ink is ejected from a recording head 8 disposed so that an ejection orifice surface 8a of the recording head 8 is at an angle of 0° or more to less than 90° with respect to the direction of gravity, that is, the ejection orifice surface 8a is inclined with respect to the direction of gravity, such that an image is recorded. As illustrated in FIG. 1C, the ejection orifice surface 8a of the recording head 8 may be at an angle of 0° with respect to the direction of gravity, that is, the ejection orifice surface 8a may be approximately parallel with the direction of gravity.

It was found that in the case of using a recording head inclined with respect to the direction of gravity and having a plurality of ejection orifice arrays for ejecting a plurality of inks, when a state in which ink was not ejected from ejection orifices for a predetermined time was maintained after continuously recording an image, color mixing occurred in an image. The reason is as follows.

In the case of continuously recording an image, ink overflowed at the time of ejecting the ink easily adheres to a periphery of the ejection orifice. Further, in addition to a main ink droplet, small accompanying ink droplets (hereinafter, referred to as "mist") increase, and the mist tends to adhere to the periphery of the ejection orifice. When a state in which ink is not ejected from the ejection orifice having the periphery to which the ink adheres for a predetermined time is maintained, as a liquid component in the adhered ink evaporates, a resin in the ink is precipitated, such that unevenness is highly likely to occur in the periphery of the ejection orifice. Particularly, evaporation of the liquid component in the adhered ink is promoted in a high-temperature or low-humidity environment. In the case of continuously recording an image again, although the periphery of the ejection orifice is in a state in which the ink easily adheres thereto, the ink more easily adheres thereto due to unevenness formed in the periphery of the ejection orifice.

The phenomenon that ink tends to adhere to the periphery of the ejection orifice is a phenomenon which occurs also in a general ink jet recording method in which an image is recorded by ejecting ink from a recording head 8 disposed so that an ejection orifice surface 8a is perpendicular to the direction of gravity. In this case, color mixing of the ink did not occur. The color mixing of the ink is a problem occurring when an image is recorded using a recording head 8 in which an ejection orifice surface 8a of the recording head 8 is inclined with respect to the direction of gravity.

Here, as an example, a description is provided based on adjacent ejection orifice arrays I and II of a recording head 8 having an ejection orifice surface 8a in which four ejection orifice arrays I to IV are formed as illustrated in FIG. 1B. An ejection orifice group forming each of the ejection orifice arrays is disposed to be substantially orthogonal to a conveying direction (an arrow A in FIG. 1B) of a recording medium. The recording medium is conveyed in an arrow A direction, and ink is ejected onto the recording medium in a sequence of the ejection orifice array I and II.

When an image is recorded using a recording head 8 in which an ejection orifice surface 8a is inclined with respect to the direction of gravity, in the peripheries of the ejection orifices constituting the ejection orifice array II, force is applied to ink adhered in a direction of the ejection orifice array I in the direction of gravity. Therefore, in the peripheries of the ejection orifices constituting the ejection orifice array II, the ink tends to accumulate in the direction of the ejection orifice array I. In the case of continuously recording the image, the ink further accumulates in the direction of the ejection orifice array I in the peripheries of the ejection orifices constituting the ejection orifice array II. In addition, an ink meniscus formed at the ejection orifice of the ejection orifice array II is destroyed, whereby the ink overflows, and the ink ejected from the ejection orifice array II flows along the ejection orifice surface 8a to thereby enter the ejection orifice array I. As a result, color mixing occurs in the ink ejected from the ejection orifice array I, such that color mixing occurs in the recorded image.

Further, in a recording head in which the ejection orifice arrays I and II are arranged to at least partially overlap each other in the conveying direction of the recording medium, the ink ejected from the ejection orifice array II tends to enter the ejection orifice array I. As a result, color mixing occurs in the ink ejected from the ejection orifice array I, such that color mixing occurs in the recorded image.

In order to suppress color mixing in the image, the present inventors focused on a relationship between amounts of the resin in the inks ejected from two adjacent ejection orifice arrays. In the case of ejecting ink with a large content of a resin, the resin is easily precipitated in the periphery of the ejection orifice. Therefore, unevenness is formed in the periphery of the ejection orifice, such that the ink easily adheres thereto. When an ejection orifice array for ejecting the ink with a large content of the resin is disposed at an upper side in the direction of gravity, the ink with a large content of the resin enters ink with a small content of the resin. Therefore, color mixing of the ink occurs, and thus, color mixing occurs in an image to be recorded. Meanwhile, even though ink with a small content of the resin is ejected, it is hard for the resin to be precipitated in the periphery of the ejection orifice. Therefore, unevenness is less likely to occur in the periphery of the ejection orifice, and it is hard for the ink to adhere to the ejection orifice. Even in the case of disposing an ejection orifice array for ejecting the ink with a small content of the resin at the upper side in the direction of gravity, the ink with a small content of the resin is less likely to enter the ink with a large content of the resin. Therefore, color mixing of the ink is less likely to occur, such that color mixing in an image to be recorded can be suppressed. That is, color mixing in the image can be suppressed by disposing the ejection orifice array for ejecting the ink with a small content of the resin at the upper side in the direction of gravity.

<Ink Jet Recording Method>

In the recording head used in the present invention, first ejection orifice array for ejecting first ink and second ejection orifice array for ejecting second ink, respectively, are sequentially arranged from the bottom in the direction of gravity to be adjacent to each other. In addition, a content of the resin in the second ink is smaller than that in the first ink. Even in the case in which the recording head includes a plurality of ejection orifice arrays (third and fourth ejection orifice arrays), it is preferable that the relationship between the contents of the resin in the inks ejected from adjacent ejection orifice arrays is satisfied. In this way, color mixing in the image can be suppressed.

Further, colors of the first and second inks may be the different from or the same as each other. When the colors of the first and second inks are different from each other, color mixing in the image to be recorded is easily noticed, but even in this case, color mixing in the image can be suppressed by adopting a configuration according to the present invention. The colors of the first and second inks can be selected from black, cyan, magenta, yellow, and the like. In the case of different colors, the first and second inks are preferably combinations of two inks selected from the group consisting of black, cyan, magenta, and yellow inks, respectively. In the case of the same color, the first and second inks are related to a dark ink and a light ink. The combination of the first and second inks is preferably one selected from the group consisting of a combination of a dark ink having a black color (black ink) and a light ink having the black color (grey ink), a combination of a dark ink having a cyan color (cyan ink) and a light ink having the cyan color (light cyan ink), and a combination of a dark ink having a magenta color (magenta ink) and a light ink having the magenta color (light magenta ink).

<Ink Jet Recording Apparatus>

Hereinafter, in FIGS. 2A to 4B, an X direction refers to a horizontal direction, a Y direction refers to a depth direction of an ink jet recording apparatus, and a Z direction refers to a vertical direction.

Figure 2B:
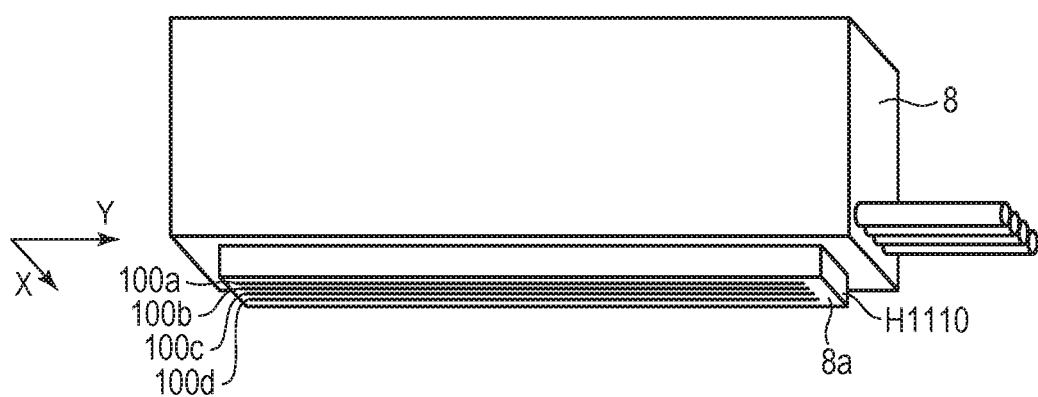
FIG. 2B, which is a view for explaining an example of the recording head, is a perspective view of the recording head.

FIGS. 2A and 2B are views for explaining an example of a recording head, wherein FIG. 2A is a schematic view of a recording element substrate and FIG. 2B is a perspective view of the recording head. The recording head 8 has an ejection orifice surface 8a in which a plurality of ejection orifice arrays for ejecting a plurality of inks are formed. Particularly, it is preferable to use a recording head 8 including a single recording element substrate H1110 in which the plurality of ejection orifice arrays 100a to 100d are arranged as illustrated in FIGS. 2A and 2B. FIG. 2A illustrates a recording element substrate H1110 having four ejection orifice arrays (100a to 100d) arranged in the Y direction. The ejection orifice surface 8a of the recording head 8 is a surface provided with the recording element substrate H1110 having the ejection orifice arrays 100a to 100d. The recording element substrate H1110 may have the plurality of ejection orifice arrays. For example, in the case in which a single recording element substrate H1110 has four election orifice arrays 100a to 100d, four kinds of inks such as cyan, magenta, yellow, and black (CMYK) inks are ejected from four ejection orifice arrays 100a to 100d.

A distance (mm) between an ejection orifice array composed of ejection orifices ejecting one kind of ink and an ejection orifice array composed of ejection orifices ejecting another kind of ink is preferably 0.1 mm or more to 1.5 mm or less and more preferably, 0.1 mm or more to 1.0 mm or less. Further, more preferably, the distance is 0.3 mm or more to 1.0 mm or less. Here, the distance between the ejection orifice arrays is a distance between a straight line connecting the center of each ejection orifice ejecting one kind of ink and a straight line connecting the center of each ejection orifice ejecting another kind of ink. In the case in which there are a plurality of ejection orifice arrays for ejecting one kind of ink, the distance between an ejection orifice array composed of ejection orifices ejecting one kind of ink and an ejection orifice array composed of ejection orifices ejecting another kind of ink. The ejection arrays are spaced at the nearest distance in the X direction.

When the distance between the ejection orifice arrays is short, since the ejection orifice arrays are densely arranged, a higher quality image can be recorded, but since color mixing of the ink from the ejection orifice to another ejection orifice easily occurs, a problem such as color mixing in the image to be recorded significantly occurs. Even in this case, it is possible to suppress color mixing in the image by adopting the configuration according to the present invention.

A long diameter (μm) passing through the center of the ejection orifice of the recording head 8 is preferably 10 μm or more to 50 μm or less. Further, an ejection amount (ng) of the one ink droplet ejected from the recording head 8 is preferably 8.0 ng or less. When the ejection amount is more than 8.0 ng, since at the time of ejecting the ink, the ink easily overflows and thus the mist is easily increased, the ink more easily adheres to the periphery of the ejection orifice. Therefore, color mixing of the ink may easily occur, such that color mixing in the image may not be sufficiently suppressed. When the ejection amount (ng) is preferably 2.0 ng or more.

FIG. 2B illustrates a recording head 8 including one recording element substrate H1110. The recording head 8 may include one recording element substrate H1110 or may also include a plurality of recording element substrates H1110. In the case of using the recording head including the plurality of recording element substrates H1110, a recording head in which a plurality of recording element substrates H1110 are arranged so as to correspond a width of the recording medium in the Y direction in FIGS. 2A and 2B, that is, a line head is preferably used. In the case of using the recording head including the plurality of recording element substrates H1110, it is preferable to arrange the plurality of recording element substrates H1110 so that the ejection orifices overlap each other in the conveying direction of the recording medium. In this way, it is possible to suppress black streaks and white voids in connection portions between the recording element substrates H1110. However, since the ejection orifices overlap each other, color mixing of the ink from the ejection orifice to another ejection orifice easily occurs, and thus the problem such as color mixing in the image to be recorded significantly occurs. Even in this case, it is possible to suppress color mixing in the image by adopting the configuration according to the present invention.

FIGS. 3A and 3B are schematic views of line heads, wherein FIG. 3A is a schematic view of a line head in which the recording element substrates H1110 are arranged in a zigzag shape (non-adjacent arrangement) in an arrangement direction of a plurality of ejection orifice arrays. FIG. 3B is a schematic view of a line head in which the recording element substrates H1110 are arranged in a linear shape (adjacent arrangement) in an arrangement direction of a plurality of ejection orifice arrays. In FIGS. 3A and 3B, a plurality of recording element substrates H1110 are arranged on a support substrate, respectively. In view of miniaturization of the apparatus, it is preferable to use a line head in which a plurality of recording element substrates H1110 are arranged to be adjacent in an arrangement direction of the first ejection orifice array and the second ejection orifice array in order to suppress an increase in a length of the line head in the X direction in FIGS. 3A and 3B. In other words, it is preferable to use a line head in which a plurality of recording element substrates H1110 are arranged in a linear shape. Further, an example of a shape of the recording element substrate H1110 includes a parallelogram, a rectangle, a trapezoid, and other shapes, but the parallelogram is preferable.

As a method of ejecting the ink, a method of applying mechanical energy to the ink, a method of applying heat energy to the ink, and the like, can be used. Among them, as the method of ejecting the ink, the method of applying heat energy to the ink is preferably used.

Figure 4A:
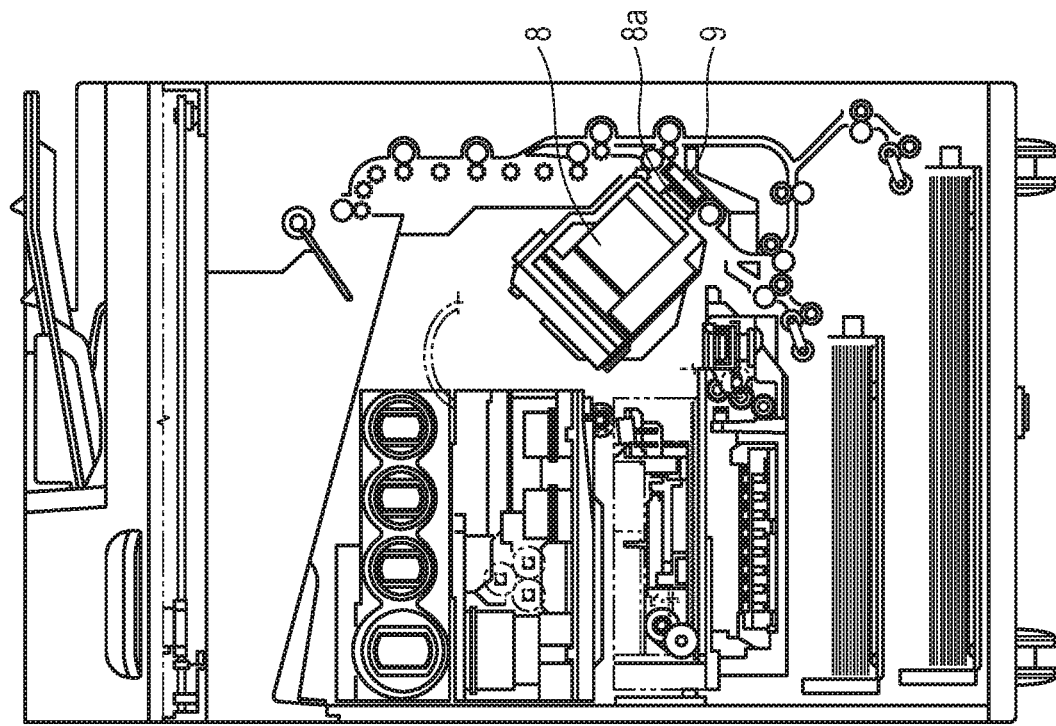
FIG. 4A, which is a view schematically illustrating an example of an ink jet recording apparatus, is a cross-sectional view of an entire apparatus.
Figure 4B:
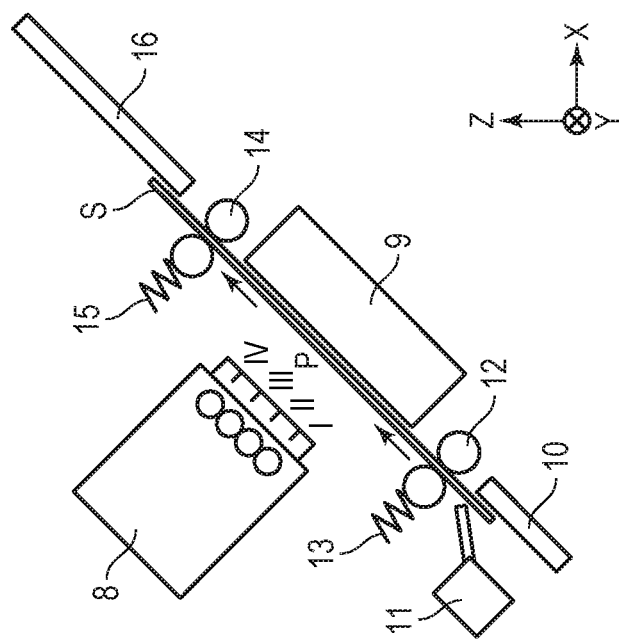
FIG. 4B, which is a view schematically illustrating an example of the ink jet recording apparatus, is an enlarged view of a portion around the recording head.

FIGS. 4A and 4B are views schematically illustrating an example of an ink jet recording apparatus, wherein FIG. 4A is a cross-sectional view of an entire apparatus, and FIG. 4B is an enlarged view of a portion around the recording head. As illustrated in FIGS. 4A and 4B, in order to miniaturize the apparatus, it is preferable to use an ink jet recording apparatus capable of recording an image by a single recording head capable of ejecting a plurality of inks instead of a plurality of recording heads corresponding to the plurality of inks. At the time of ejecting the ink to record an image, as illustrated in FIGS. 4A and 4B, an angle formed between an ejection orifice surface 8a of the recording head 8 and the direction of gravity is 0° or more to less than 90° and the ink is ejected from a recording head 8 inclined with respect to the direction of gravity, such that the image is recorded.

In addition, at the time of ejecting the ink to record the image, a difference between an angle formed between a recording medium S and the direction of gravity and the angle formed between the ejection orifice surface 8a of the recording head 8 and the direction of gravity is preferably ±5° or less and more preferably 0°. That is, a difference between a distance between ejection orifices forming an ejection orifice array I and the recording medium S and a distance between ejection orifices forming an ejection orifice array IV and the recording medium S is preferably ±1 mm or less and more preferably 0 mm. Here, the distance between the ejection orifice and the recording medium S is a distance between the center of the ejection orifice and a position at which a line intersects the recording medium S when the line is extended from the center of the ejection orifice in the direction of gravity. As described above, by setting the conveying direction of the recording medium S at the time of recording an image to the above conditions, a conveying distance of the recording medium S in the X direction is also shortened, thereby making it possible to miniaturize the apparatus. In order to shorten the conveying distance of the recording medium S in the X direction, the angle formed between the ejection orifice surface 8a of the recording head 8 and the direction of gravity is 10° or more to 80° or less, and more preferably 30° or more to 60° or less.

The ejection orifice surface 8a of the recording head 8 faces a platen 9. In FIGS. 4A and 4B, a plane of the platen 9 is inclined at about 45° with respect to the direction of gravity, and the ejection orifice surface 8a of the recording head 8 is also inclined at about 45° with respect to the direction of gravity so that a distance from the platen 9 is constantly maintained. When the ink jet recording apparatus does not perform a recording operation, the angle formed between the ejection orifice surface 8a of the recording head 8 and the direction of gravity is 90°.

Further, a conveyance path of the recording medium S at the time of recording an image is described. In FIG. 4B, the recording medium S is guided by a first guide 10, and a tip position of the recording medium S is detected by a paper sensor 11. The recording medium S is conveyed toward a recording region P between the recording head 8 and the platen 9 while being sandwiched between a first conveying roller 12 and a first pinch roller 13 composed of a spur energized by a spring and the like. In the recording region P, the ink is ejected from the plurality of ejection orifice arrays (I to IV) in the recording head 8 to the recording medium S. A rear surface of the recording medium S in the region to which the ink is applied is supported by the platen 9, and the distance between the ejection orifice surface 8a and the recording medium S is constantly maintained. After the ink is applied, the recording medium S is guided by a second guide 16 while being sandwiched between a second conveying roller 14 and a second pinch roller 15, such that the recording medium S is conveyed. The conveying direction of the recording medium S at the time of recording the image may be opposite to a direction illustrated in FIG. 4B, but it is preferable that the conveying direction is the same direction as the direction illustrated in FIG. 4B. That is, it is preferable that a first ejection orifice array (ejection orifice array I) disposed at an upstream side in the conveying direction of the recording medium S is disposed at the lower side in the direction of gravity than a second ejection orifice array (ejection orifice array II) disposed at a downstream side in the conveying direction of the recording medium S. In addition, it is preferable that the conveying direction of the recording medium S at the time of recording the image is a direction intersecting an arrangement direction of the ejection orifice arrays I to IV.

In order to suppress a variation in the ejection amount of the ink, it is preferable to preheat the ink before ejecting the ink based on image data. This preheating is an operation of heating the ink using a heating element present in the vicinity of the recording element for ejecting the ink. Since drying of the ink is promoted and a viscosity of the ink is easily lowered by heating the ink, the ink ejected from the ejection orifice is likely to flow along the ejection orifice surface 8a, such that color mixing of the ink easily occurs. Therefore, the problem such as color mixing in the image to be recorded significantly occurs. Even in this case, it is possible to suppress color mixing in the image by adopting the configuration according to the present invention.

Further, it is preferable that the ejection orifice surface 8a of the recording head 8 is subjected to water-repellent treatment. In this way, since a contact angle between the ink adhered to the periphery of the ejection orifice surface 8a and the ejection orifice surface 8a is increased, the ink droplets easily become granular. Therefore, it is hard for the ink to flow along the ejection orifice surface 8a in the direction of gravity and color mixing in the image can be further suppressed.

As a method of performing water-repellent treatment on the ejection orifice surface, a method of applying a water-repellent material with a spray, a method of adhering a water-repellent material by vacuum deposition or plasma polymerization, and the like can be selected. Water-repellency of the formed ejection orifice surface can be determined by measuring a contact angle of a water droplet on a surface of the member. When the contact angle of the water droplet is 70° or more, the member can be said to have water-repellency, and it is preferable that the contact angle of the water droplet is 90° or more. Further, the contact angle of the water droplet can be measured using pure water (ion exchange water) and a general contact angle meter. As an example of the contact angle meter, an automatic contact angle measuring device (CA-W, Kyowa Interface Science Co., Ltd.) can be used.

As an example of the water-repellent material, a fluororesin based compound is preferably used. Particularly, it is preferable that a water-repellent surface is formed as a uniform resin film made of the fluororesin based compound, and it is preferable that the resin film does not contain a metal such as nickel or the like. Examples of the fluororesin based compound include a polytetrafluoroethylene resin, a fluororesin having a cyclic structure, and the like. Specific examples thereof can include Polyflon PTFE (manufactured by Daikin Industries, Ltd), Teflon (registered trademark) PTFE (manufactured by DuPont), Cytop (manufactured by AGC Inc.), and the like. In addition, other fluorine atom-containing resins such as fluorinated epoxy resins, fluorinated polyimide resins, fluorinated polyamide resins, fluorinated acrylic resins, fluorinated urethane resins, fluorinated siloxane resins, modified resins thereof, and the like can also be used. Further, as the water-repellent material, compounds containing a silicon atom or silicone based resins may be used.

Particularly, in view of obtaining high water-repellency and durability, as the water-repellent material, it is preferable to use a hydrolyzable silane compound having a fluoroalkyl group and a condensate of a hydrolyzable silane compound having a cationic polymerizable group. Further, a resin obtained by curing the condensate by irradiation with an active energy ray such as ultraviolet ray or the like may also be used. These hydrolyzable silane compounds have a hydrolyzable group in their molecular structure. An example of the hydrolyzable group can include an alkoxy group. Further, examples of the cationic polymerizable group can include a cyclic ether group, a cyclic vinyl ether group, and the like.

The ink jet recording apparatus may include a unit applying a reaction liquid containing a reaction agent for aggregating a coloring material in the ink onto the recording medium. Examples of the unit applying the reaction liquid onto the recording medium include a unit applying the reaction liquid onto the recording medium with a roller or the like, a unit ejecting the reaction liquid from an ink jet type recording head, and the like. The ink jet recording apparatus according to the present invention does not have to include an irradiation unit of an energy ray.

<Ink>

Hereinafter, each component constituting the ink used in the present invention is described in detail. The inks used in the present invention may not contain compounds polymerized by irradiation with an energy ray.

(Coloring Material)

The ink contains a coloring material. As the coloring material, a pigment or a dye can be used. A content of the coloring material in the ink is preferably 0.1% by mass or more to 15.0% by mass or less and more preferably 1.0% by mass or more to 11.0% by mass or less based on a total mass of the ink. As the dye, a dye having an anionic group is preferably used. Specific examples of the dye can include azo, triphenylmethane, (aza) phthalocyanine, xanthene, anthrapyridone, and the like.

As a dispersion method of the pigment, a resin-dispersed pigment using a resin as a dispersant, a self-dispersible pigment in which a hydrophilic group is bonded to a particle surface of the pigment, and the like can be used. Further, a resin-bonded pigment in which an organic group containing a resin is chemically bonded to a particle surface of the pigment and a microcapsule pigment in which a particle surface of the pigment is coated with a resin or the like can also be used. It is possible to use pigments of which dispersion methods are different from each other in combination.

Specific examples of the pigment can include inorganic pigments such as carbon black and titanium oxide; and organic pigments such as azo, phthalocyanine, quinacridone, isoindolinone, imidazolone, diketopyrrolopyrrole, dioxazine, and the like.

Among them, the pigment is preferably used as the coloring material. An ink containing a pigment having high hydrophobicity on a particle surface as described below as the pigment can also be used. The pigment having high hydrophobicity on the particle surface easily adheres to a hydrophobic unit of the precipitated resin in the periphery of the ejection orifice. Therefore, unevenness is more likely to occur in the periphery of the ejection orifice due to the precipitated resin and the pigment adhered to the resin, and the ink easily adheres to the periphery of the ejection orifice. Therefore, although it is thought that color mixing of the ink easily occurs, the ejection orifice array for ejecting the ink with a relatively small content of the resin is disposed at the upper side in the direction of the gravity, such that precipitation of the resin in the periphery of the ejection orifice becomes difficult, it is hard for the pigment to adhere thereto, and unevenness is less likely to occur in the periphery of the ejection orifice. Therefore, since it is hard for the ink to adhere to the periphery of the ejection orifice, color mixing of the ink hardly occurs, and color mixing in the image can be suppressed.

Examples of the pigment having high hydrophobicity on the particle surface can include azos such as C.I. pigment yellow 74 and C.I. pigment yellow 155, quinacridones and solid solutions of a plurality of quinacridones such as C.I. pigment violet 19, C.I. pigment red 122, C.I. pigment red 202, and C.I. pigment red 209, phthalocyanine such as C.I. pigment blue 15:3 and C.I. pigment blue 15:4, and the like. Among these pigments, hydrophobicity is increased in a sequence of azo, quinacridone and the solid solution of the plurality of quinacridones, and phthalocyanine. Here, an ink in which a content of at least one coloring material selected from the group consisting of C.I. pigment yellow 74 and C.I. pigment yellow 155 is 50.0% by mass or more based on a total content of the coloring materials in the ink is a yellow ink. An ink in which a content of at least one pigment selected from the group consisting of C.I. pigment violet 19, C.I. pigment red 122, C.I. pigment red 202, and C.I. pigment red 209 or solid solution formed from two or more of the pigment is 50.0% by mass or more based on a total content of the coloring materials in the ink is a magenta ink. An ink in which a content of at least one coloring material selected from the group consisting of C.I. pigment blue 15:3 and C.I. pigment blue 15:4 is 50.0% by mass or more based on a total content of the coloring materials in the ink is a cyan ink.

Particularly, it is preferable to dispose an ink containing a pigment having relatively low hydrophobicity on the particle surface among the inks ejected from two adjacent ejection orifice arrays at the upper side in the direction of the gravity. In this way, since it is hard for the pigment to adhere to the resin precipitated in the periphery of the ejection orifice, unevenness is less likely to occur in the periphery of the ejection orifice. Since it is hard for the ink to adhere to the periphery of the ejection orifice, color mixing of the ink hardly occurs, and color mixing in the image can be further suppressed. That is, it is preferable to dispose an ink containing a pigment having a relatively small content of the resin and relatively low hydrophobicity on the particle surface among the inks ejected from two adjacent ejection orifice arrays at the upper side in the direction of the gravity.

(Resin)

At least one kind of ink among the plurality of inks ejected from respective ejection orifice arrays I to IV (first to fourth ejection orifice arrays) contains a resin. Further, it is preferable that each ink of the plurality of inks contains the resin.

The resin can be added for reasons such as (i) stabilizing a dispersion state of the pigment, that is, as a resin dispersant or a dispersion aid, (ii) improving various properties of the image to be recorded, and the like. As a form of the resin there are a block copolymer, a random copolymer, a graft copolymer, a combination of these copolymers, and the like. Further, the resin may be in a state in which the resin is dissolved in an aqueous medium as a water-soluble resin and may also be in a state in which the resin is dispersed in an aqueous medium as resin particles. The resin particles do not have to contain a coloring material. Particularly, it is preferable that the resin is the water-soluble resin.

In the present invention, the resin is water-soluble, which means that the resin does not form particles of which a diameter can be measured by a dynamic light scattering method when the resin is neutralized with an alkali in an amount equivalent to an acid value of the resin. Whether or not the resin is water soluble can be determined by a method described below. First, a liquid (resin solid content: 10% by mass) containing a resin neutralized by alkali (sodium hydroxide, potassium hydroxide, or the like) equivalent to an acid value is prepared. Next, the prepared liquid is diluted 10 times with pure water (based on volume), thereby preparing a sample solution. Then, when a particle having a particle diameter is not measured in the case of measuring a particle diameter of the resin in the sample solution by the dynamic light scattering method, it can be determined that the resin is water soluble. In this case, for example, measurement conditions can be set as follows: SetZero: 30 seconds, measurement frequency: 3 times, and measurement time: 180 seconds. As a particle size distribution analyzer, a particle size analyzer (for example, "UPA-EX150", manufactured by Nikkiso Co., Ltd.) using the dynamic light scattering method, or the like, can be used. However, the used particle size distribution analyzer or measurement conditions are not limited thereto.

Examples of the resin include an acrylic resin, a urethane resin, an olefin resin, and the like. Among them, it is preferable that the resin is the acrylic resin.

As the acrylic resin, an acrylic resin having a hydrophilic unit and a hydrophobic unit as constituent units is preferable. Among them, a resin having a hydrophilic unit derived from (meth)acrylic acid and a hydrophobic unit derived from a monomer of at least one of styrene and α-methylstyrene is preferable. Since these resins easily interact with pigments, these resins can be appropriately used as resin dispersants for dispersing the pigments.

The hydrophilic unit is a unit having a hydrophilic group such as an anionic group or the like. The hydrophilic unit can be formed by polymerizing, for example, a hydrophilic monomer having a hydrophilic group. Specific examples of the hydrophilic monomer having a hydrophilic group can include acidic monomers having a carboxylic acid group such as (meth)acrylic acid, itaconic acid, maleic acid, fumaric acid, or the like, anionic monomers such as anhydrides or salts of these acid monomers, and the like. Examples of cations constituting the salts of the acidic monomers can include lithium, sodium, potassium, ammonium, and organic ammonium ions and the like. The hydrophobic unit is a unit that does not have the hydrophilic group such as the anionic group or the like. The hydrophobic unit can be formed by polymerizing, for example, a hydrophobic monomer that does not have the hydrophilic group such as the anionic group or the like. Specific examples of the hydrophobic monomer can include monomers having an aromatic ring such as styrene, α-methylstyrene, benzyl (meth)acrylate; (meth)acrylic acid ester based monomers such as methyl (meth)acrylate, butyl (meth)acrylate, 2-ethylhexyl (meth)acrylate, and the like.

The urethane resin can be obtained by reacting, for example, polyisocyanate and polyol with each other. Further, a chain extender may be additionally reacted therewith. Examples of the olefin based resin include polyethylene, polypropylene, and the like.

The resin is preferably used as the resin dispersant for dispersing the pigment. Whether or not the resin is the resin dispersant can be determined by a method described below. First, a liquid obtained by concentrating or diluting the ink so that a solid content in the ink is about 10% by mass is centrifuged at 12,000 rpm for 1 hour. In this way, since the resin that does not contribute to dispersing the pigment is contained in a liquid layer, a sedimentation component containing the pigment is collected. In this case, a resin contained in the sedimentation component containing the pigment as a main component is a resin (resin dispersant) contributing to dispersing the pigment, and a resin contained in the liquid layer as a main component is a resin that does not contribute to dispersing the resin.

A content (% by mass) of the resin in the ink is preferably 0.5% by mass or more to 10.0% by mass or less, more preferably 0.5% by mass or more to 8.0% by mass or less, and further more preferably 2.0% by mass or more to 8.0% by mass or less, based on a total mass of the ink. In the case of using the resin dispersant as the resin, a content (% by mass) of a coloring material is preferably 2.0 times or more to 10.0 times or less as a mass ratio with respect to a content (% by mass) of the resin dispersant.

(First Water-Soluble Organic Solvent)

It is preferable that the ink containing a resin contains a first water-soluble organic solvent having a relative dielectric constant of 20.0 or more. Since precipitation of the resin is suppressed, unevenness is less likely to occur in the periphery of the ejection orifice, such that it is hard for the ink to accumulate in the periphery of the ejection orifice, and thus it is hard for the ink to flow along the ejection orifice surface 8a. In this way, color mixing of the ink is suppressed, such that color mixing in the image can be suppressed. The relative dielectric constant of the first water-soluble organic solvent is preferably 45.0 or less. A vapor pressure of the first water-soluble organic solvent at a temperature of 25° C. is preferably lower than that of water.

A relative dielectric constant of a water-soluble organic solvent can be measured at 10 kHz using a dielectric constant meter (for example, BI-870 manufactured by Brookhaven Instruments Corp. or the like). The relative dielectric constant $\varepsilon_{sol}$ of a water-soluble organic solvent in a solid state at a temperature of 25° C. can be calculated according to the following Equation (1) by measuring a relative dielectric constant $\varepsilon_{50\%}$ of a 50.0% by mass aqueous solution.

$$\varepsilon_{sol}=2\varepsilon_{50\%}-\varepsilon_{water} \quad \text{Equation (1)}$$

$\varepsilon_{sol}$: relative dielectric constant of the water-soluble organic solvent in a solid state at a temperature of 25° C.

$\varepsilon_{50\%}$: relative dielectric constant of 50.0% by mass aqueous solution of the water-soluble organic solvent in the solid state at a temperature of 25° C.

$\varepsilon_{water}$: relative dielectric constant of water

The reason for calculating the relative dielectric constant $\varepsilon_{sol}$ of the water-soluble organic solvent in the solid state at a temperature of 25° C. from the relative dielectric constant $\varepsilon_{50\%}$ of the 50.0% by mass aqueous solution is as follows. It may be difficult to prepare a high-concentration aqueous solution with a concentration exceeding 50.0% by mass from a water-soluble organic solvent capable of being a constituent component of the ink among water-soluble organic solvents in the solid state at a temperature of 25° C. Meanwhile, the relative dielectric constant $\varepsilon_{water}$ of water is dominant in a low-concentration aqueous solution with a concentration of 10.0% by mass or less, such that it is difficult to obtain a value of a probable (effective) relative dielectric constant ssoi of a water-soluble organic solvent. Therefore, as a result of the study by the present inventors, it was found that aqueous solutions to be measured can be prepared using most of the water-soluble organic solvents in a solid state at a temperature of 25° C. used in the ink, and the calculated relative dielectric constants $\varepsilon_{sol}$ is also consistent with the effect of the present invention. Due to the above-mentioned reason, in the present invention, the relative dielectric constant $\varepsilon_{sol}$ of the water-soluble organic solvent in the solid state at a temperature of 25° C. is calculated from the relative dielectric constant $\varepsilon_{50\%}$ of the 50.0% by mass aqueous solution to thereby be used. Even in the case of the water-soluble organic solvent in the solid state at a temperature of 25° C., when solubility in water is low and thus it is impossible to prepare a 50.0% by mass aqueous solution, an aqueous solution with a saturated concentration is used, and a value of the relative dielectric constant calculated in accordance with the case of calculating $\varepsilon_{sol}$ is used for convenience.

Specific examples of the first water-soluble organic solvent include monohydric alcohols having 1 to 4 carbon atoms such as methyl alcohol (33.1) and ethyl alcohol (23.8); dihydric alcohols such as 1,2-propanediol (28.8), 1,3-butanediol (30.0), 1,4-butanediol (31.1), 1,5-pentanediol (27.0), and 3-methyl-1,5-pentanediol (23.9); polyhydric alcohols such as 1,2,6-hexanetriol (28.5), glycerin (42.3), and trimethylolpropane (33.7); alkylene glycols such as ethylene glycol (40.4), diethylene glycol (31.7), triethylene glycol (22.7), and tetraethylene glycol (20.8); nitrogen-containing compounds such as 2-pyrrolidone (28.8), N-methyl-2-pyrrolidone (32.0), urea (110.3), ethyleneurea (49.7), and triethanolamine (31.9); and sulfur-containing compounds such as dimethylsulfoxide (48.9).

(Aqueous Medium)

The ink can contain water or an aqueous medium which is a mixed medium of water and a water soluble organic solvent. As the water, deionized water or ion exchange water is preferably used. A content (% by mass) of water in aqueous ink is 50.0% by mass or more to 95.0% by mass or less based on the total mass of the ink.

As the water-soluble organic solvent, a water-soluble organic solvent (other water-soluble organic solvents) in addition to the first water-soluble organic solvent can be used in combination. Other water-soluble organic solvents are not particularly limited as long as they are water-soluble. For example, alcohols, glycols, glycol ethers, nitrogen-containing compounds, and the like can be used. Further, one or two kinds or more of other water-soluble organic solvents can be contained in the ink. A content (% by mass) of the water-soluble organic solvent in the ink is 3.0% by mass or more to 50.0% by mass or less based on the total mass of the ink. The content is a value including the content of the first water-soluble organic solvent. The content (% by mass) of the first water-soluble organic solvent is preferably 0.4 times or more to 1.0 time or less as a mass ratio (times) with respect to a total content (% by mass) of the water-soluble organic solvents. When the ratio is more preferably 0.5 times or more to 1.0 time or less and further more preferably 0.7 times or more to 1.0 times or less.

Specific examples of the water-soluble organic solvent include the following organic solvents as well as the specific water-soluble organic solvents described above (numerical values in parentheses indicate relative dielectric constant $\varepsilon_{sol}$ at a temperature of 25° C.). Monohydric alcohols having 1 to 4 carbon atoms such as methyl alcohol (33.1), ethyl alcohol (23.8), n-propyl alcohol, isopropyl alcohol (18.3), n-butyl alcohol, sec-butyl alcohol, and tert-butyl alcohol; dihydric alcohols such as 1,2-propanediol (28.8), 1,3-butanediol (30.0), 1,4-butanediol (31.1), 1,5-pentanediol (27.0), 1,2-hexanediol (14.8), 1,6-hexanediol (7.1), 2-methyl-1,3-propanediol, and 3-methyl-1,5-pentanediol (23.9); polyhydric alcohols such as 1,2,6-hexanetriol (28.5), glycerin (42.3), trimethylolpropane (33.7), and trimethylolethane; alkylene glycols such as ethylene glycol (40.4), diethylene glycol (31.7), triethylene glycol (22.7), tetraethylene glycol, butylene glycol, hexylene glycol, and thiodiglycol; glycol ethers such as diethylene glycol monomethyl ether, diethyleneglycol monoethyl ether, triethylene glycol monoethyl ether, and triethylene glycol monobutyl ether (9.8); polyalkylene glycols having a number average molecular weight of 200 or more to 1,000 or less such as polyethylene glycol (11.5) having a number average molecular weight of 600, polyethylene glycol (4.6) having a number average molecular weight of 1,000, and polypropylene glycol; nitrogen-containing compounds such as 2-pyrrolidone (28.8), N-methyl-2-pyrrolidone (32.0), 1,3-dimethyl-2-imidazolidinone, N-methylmorpholine, urea (110.3), ethyleneurea (49.7), and triethanolamine (31.9); and sulfur-containing compounds such as dimethylsulfoxide (48.9) and bis(2-hydroxyethylsulfone) are exemplified. As the water-soluble organic solvent to be contained in the ink, a water-soluble organic solvent of which a relative dielectric constant $\varepsilon_{sol}$ is 3.0 or more and a vapor pressure at a temperature of 25° C. is lower than that of water is preferable.

A content (% by mass) of the first water-soluble organic solvent is preferably 2.5 times or more as a mass ratio (times) with respect to a content (% by mass) of the resin. When the ratio is 2.5 times or more, since the content of the first water-soluble organic solvent is larger than that of the resin, precipitation of the resin can be suppressed. Therefore, color mixing of the ink is less likely to occur, such that color mixing in the image can be further suppressed. The ratio is preferably 50.0 times or less and more preferably 10.0 times or less. Further, it is preferable that a content (% by mass) of the first water-soluble organic solvent in ink with a small content of the resin is preferably 3.0 times or more as a mass ratio (times) with respect to a content (% by mass) of the resin in the ink with a small content of the resin. When the ratio is 3.0 times or more, precipitation of the resin in the periphery of the ejection orifice disposed at the upper side in the direction of gravity can be further suppressed. Therefore, color mixing of the ink is less likely to occur, such that color mixing in the image can be further suppressed. The ratio is preferably 10.0 times or less.

In addition, it is preferable that contents (% by mass) of the pigment and the resin in the ink with a small content of the resin are smaller than contents (% by mass) of the pigment and the resin in ink with a large content of the resin. In the periphery of the ejection orifice disposed at the upper side in the direction of gravity, precipitation of the pigment or the resin is less likely to occur. Therefore, since unevenness is less likely to occur in the periphery of the ejection orifice, it is hard for the ink to adhere thereto. Therefore, color mixing of the ink is less likely to occur, such that color mixing in the image can be further suppressed.

(Other Additives)

If necessary, the ink may contain various additives such as a surfactant, a pH adjusting agent, a defoaming agent, a rust preventing agent, an antiseptic, an antifungal agent, an antioxidant, a reduction inhibitor, a chelating agent, a resin, and the like. Further, in general, since a content of these additives in the ink is significantly small, an influence on the effect of the present invention also is small. For this reason, in the present invention, these additives are not included in the "water-soluble organic solvent" and are not subject to calculation of the relative dielectric constant $\varepsilon_{sol}$. A content (% by mass) of the surfactant is preferably 0.1% by mass or more to 5.0% by mass or less and more preferably 0.2% by mass or more to 3.0% by mass or less based on the total mass of the ink. As the surfactant, a non-ionic surfactant is preferably used.

(Physical Properties)

In order to suppress color mixing of the ink, it is important to make it hard for the ink to adhere to the periphery of the ejection orifice at the time of ejecting the ink. Therefore, since a time required from foaming to ejecting the ink is several milliseconds (msec), attention was focused on a dynamic surface tension of the ink at 10 msec as a very short lifetime that can be accurately measured. The dynamic surface tension (mN/m) of the ink at a lifetime of 10 msec is preferably 35 mN/m or more.

When the dynamic surface tension is less than 35 mN/m, it is hard for tension decreasing a surface area to act on a surface of the ink, such that when the ink is ejected, the ink easily adheres to the periphery of the ejection orifice. Therefore, since the ink ejected from the ejection orifice easily flows along the ejection orifice surface 8a, color mixing of the ink occurs, such that in some cases, color mixing in the image to be recorded can not be sufficiently suppressed. The dynamic surface tension is preferably 48 mN/m or less.

The dynamic surface tension of the ink is measured by a maximum foam pressure method. In this method, surface tension is obtained by immersing a probe (thin tube) in a liquid to be measured and measuring a maximum pressure required to release air bubbles pushed out from a tip portion of the probe. Further, the lifetime is a time required to reach the maximum bubble pressure (a radius of curvature of the air bubble and a radius of the tip portion of the probe are equal to each other) after the air bubble is released and a new surface is formed when the air bubble is formed from the tip portion of the probe.

In addition, static surface tension (mN/m) of the ink is preferably 30 mN/m or more to 40 mN/m or less. The static surface tension of the ink is measured by a Wilhelmy balance method (plate method). A value of the surface tension can be appropriately adjusted depending on the kind and an amount of surfactant.

A viscosity of the ink at a temperature of 25° C. is preferably 1.0 mPa·s or more to 15.0 mPa·s or less.

Example

Hereinafter, the present invention will be described in more detail through Examples, Comparative Examples, and Reference Examples, but the present invention is not limited to the following Examples as long as the present invention does not depart from the gist thereof. Unless otherwise specified, the terms "part(s)" and "%" indicating contents are based on mass.

<Preparation of Pigment Dispersion Liquid>

(Pigment Dispersion Liquid 1)

First, 12.0 parts of a pigment, 7.5 parts of a liquid containing a resin, and 80.5 parts of ion exchange water were mixed with each other. As the pigment, C.I. pigment yellow 74 (Hansa yellow SGXB, manufactured by Clariant) was used. As the liquid containing a resin, a styrene-acrylic acid copolymer (Joncryl 680, manufactured by BASF) was neutralized with an aqueous solution of potassium hydroxide (0.85 equivalents) based on an acid value of the copolymer, such that a liquid in which a content of the resin was 20.0% was used. The mixture was dispersed for 3 hours while being cooled with water using a batch type vertical sand mill (manufactured by Aimex Co., Ltd.) filled with 85.0 parts of zirconia beads having a particle diameter of 0.3 mm. Thereafter, the dispersion liquid was subjected to centrifugation to remove coarse particles, and pressure-filtration was performed thereon using a cellulose acetate filter (manufactured by Advantech Co., Ltd.) having a pore size of 3.0 μm. A pigment dispersion liquid 1 (content of pigment: 10.0%, content of resin: 1.3%) in a state in which the pigment was dispersed in water by the resin was obtained by the above-mentioned method.

(Pigment Dispersion Liquid 2)

An amount of the liquid containing the resin was changed to 15.0 parts and an amount of ion exchange water was changed to 73.0 parts in the preparation of the pigment dispersion liquid 1. A pigment dispersion liquid 2 (content of pigment: 10.0%, content of resin: 2.5%) in a state in which the pigment was dispersed in water by the resin was obtained by a procedure similar to that in the preparation of the pigment dispersion liquid 1 except for the above-mentioned difference.

(Pigment Dispersion Liquid 3)

The kind of the pigment was changed to C.I. pigment yellow 155 (Graphtol yellow 3GP, manufactured by Clariant) in the preparation of the pigment dispersion liquid 1. A pigment dispersion liquid 3 (content of pigment: 10.0%, content of resin: 1.3%) in a state in which the pigment was dispersed in water by the resin was obtained by a procedure similar to that in the preparation of the pigment dispersion liquid 1 except for the above-mentioned difference.

(Pigment Dispersion Liquid 4)

First, 20.0 g of a pigment, 4.0 mmol of a treating agent, 8.0 mmol of nitric acid, and 200.0 mL of water were mixed with each other. As the pigment, a solid solution (Cromophtal Jet Magenta 2BC, manufactured by Ciba) of C.I. pigment red 202 and C.I. pigment violet 19 was used, and as a treating agent, p-aminophthalic acid was used. The mixture was mixed at a temperature of 25° C. and 6,000 rpm for 30 minutes using a Silverson mixer. To the obtained mixture, an aqueous solution in which 8.0 mmol of potassium nitrite was dissolved in a small amount of water was slowly added. A temperature of the mixture reached 60° C. by addition of the aqueous solution. The mixture was allowed to react at a temperature of 60° C. for 1 hour. Thereafter, a pH of the mixture was adjusted to 10 using a 1.0 mol/L aqueous solution of potassium hydroxide. After 30 minutes, 20.0 mL of water was added to the mixture, low molecular weight substances were removed using a spectrum membrane, and desalination was performed. In addition, the mixture was diluted with water, thereby obtaining a pigment dispersion liquid 4 (content of the pigment: 10.0%) containing a self-dispersible pigment. In the pigment dispersion liquid 4, a self-dispersible pigment having a —$C_6H_3$—$(COOK)_2$ group bonded to a particle surface thereof was contained.

(Pigment Dispersion Liquid 5)

The kind of pigment was changed to a solid solution (Cromophtal Jet Magenta 2BC, manufactured by Ciba) of C.I. pigment red 202 and C.I. pigment violet 19 in the preparation of the pigment dispersion liquid 1. A pigment dispersion liquid 5 (content of pigment: 10.0%, content of resin: 1.3%) in a state in which the pigment was dispersed in water by the resin was obtained by a procedure similar to that in the preparation of the pigment dispersion liquid 1 except for the above-mentioned difference.

(Pigment Dispersion Liquid 6)

An amount of the liquid containing the resin was changed to 15.0 parts and an amount of ion exchange water was changed to 73.0 parts in the preparation of the pigment dispersion liquid 1. Furthermore, the kind of the pigment was changed to a solid solution (Cromophtal Jet Magenta 2BC, manufactured by Ciba) of C.I. pigment red 202 and C.I. pigment violet 19. A pigment dispersion liquid 6 (content of pigment: 10.0%, content of resin: 2.5%) in a state in which the pigment was dispersed in water by the resin was obtained by a procedure similar to that in the preparation of the pigment dispersion liquid 1 except for the above-mentioned difference.

(Pigment Dispersion Liquid 7)

The kind of pigment was changed to C.I. pigment violet 19 (Hostaperm Red Violet Er 02, manufactured by Clariant) in the preparation of the pigment dispersion liquid 1. A pigment dispersion liquid 7 (content of pigment: 10.0%, content of resin: 1.3%) in a state in which the pigment was dispersed in water by the resin was obtained by a procedure similar to that in the preparation of the pigment dispersion liquid 1 except for the above-mentioned difference.

(Pigment Dispersion Liquid 8)

The kind of pigment was changed to C.I. pigment red 122 (Ink Jet Magenta E 02, manufactured by BASF) in the preparation of the pigment dispersion liquid 1. A pigment dispersion liquid 8 (content of pigment: 10.0%, content of resin: 1.3%) in a state in which the pigment was dispersed in water by the resin was obtained by a procedure similar to that in the preparation of the pigment dispersion liquid 1 except for the above-mentioned difference.

(Pigment Dispersion Liquid 9)

The kind of pigment was changed to C.I. pigment red 202 (Magenta RT-235-D, manufactured by BASF) in the preparation of the pigment dispersion liquid 1. A pigment dispersion liquid 9 (content of pigment: 10.0%, content of resin: 1.3%) in a state in which the pigment was dispersed in water by the resin was obtained by a procedure similar to that in the preparation of the pigment dispersion liquid 1 except for the above-mentioned difference.

(Pigment Dispersion Liquid 10)

The kind of pigment was changed to C.I. pigment red 209 (Hostaperm Red EG Transp, manufactured by BASF) in the preparation of the pigment dispersion liquid 1. A pigment dispersion liquid 10 (content of pigment: 10.0%, content of resin: 1.3%) in a state in which the pigment was dispersed in water by the resin was obtained by a procedure similar to that in the preparation of the pigment dispersion liquid 1 except for the above-mentioned difference.

(Pigment Dispersion Liquid 11)

The kind of pigment was changed to C.I. pigment blue 15:3 (Hostaperm Blue B2G, manufactured by Clariant) in the preparation of the pigment dispersion liquid 1. A pigment dispersion liquid 11 (content of pigment: 10.0%, content of resin: 1.3%) in a state in which the pigment was dispersed in water by the resin was obtained by a procedure similar to that in the preparation of the pigment dispersion liquid 1 except for the above-mentioned difference.

(Pigment Dispersion Liquid 12)

An amount of the liquid containing the resin was changed to 15.0 parts and an amount of ion exchange water was changed to 73.0 parts in the preparation of the pigment dispersion liquid 1. Further, the kind of pigment was changed to C.I. pigment blue 15:3 (Hostaperm Blue B2G, manufactured by Clariant). A pigment dispersion liquid 12 (content of pigment: 10.0%, content of resin: 2.5%) in a state in which the pigment was dispersed in water by the resin was obtained by a procedure similar to that in the preparation of the pigment dispersion liquid 1 except for the above-mentioned difference.

(Pigment Dispersion Liquid 13)

The kind of pigment was changed to C.I. pigment blue 15:4 (Heliogen Blue D7110F, manufactured by BASF) in the preparation of the pigment dispersion liquid 1. A pigment dispersion liquid 13 (content of pigment: 10.0%, content of resin: 1.3%) in a state in which the pigment was dispersed in water by the resin was obtained by a procedure similar to that in the preparation of the pigment dispersion liquid 1 except for the above-mentioned difference.

(Pigment Dispersion Liquid 14)

An amount of the treating agent was changed to 1.6 mmol and the kind of pigment was changed to C.I. pigment blue 15:3 (Hostaperm Blue B2G, manufactured by Clariant) in the preparation of the pigment dispersion liquid 4. A pigment dispersion liquid 14 (content of pigment: 10.0%) was obtained by a procedure similar to that in the preparation of the pigment dispersion liquid 4 except for the above-mentioned difference. In the pigment dispersion liquid 14, a self-dispersible pigment having a —$C_6H_3$—$(COOK)_2$ group bonded to a particle surface thereof was contained.

(Pigment Dispersion Liquid 15)

To a solution in which 5.0 g of concentrated hydrochloric acid was dissolved in 5.5 g of water, 1.6 g of 4-amino-1,2-benzene dicarboxylic acid was added at a temperature of 5° C. A solution in which 1.8 g of sodium nitrite was dissolved in 9.0 g of water was added to the solution obtained above while stirring the mixture in an ice bath in order to maintain the temperature to 10° C. or less. After the stirring for 15 minutes, 6.0 g of carbon black having a specific surface area of 220 $m^2$/g and a DBP oil absorption amount of 105 mL/100 g was added thereto and mixed therewith. Further, after the stirring for 15 minutes, obtained slurry was filtered through filter paper (standard filter paper No. 2, manufactured by Advantech Co., Ltd.), and the carbon black was sufficiently washed with water and dried in an oven at a temperature of 110° C. Water was added to the obtained carbon black, thereby obtaining a pigment dispersion liquid (content of a pigment: 10.0%) in a state in which a self-dispersible pigment having a —$C_6H_3$—$(COONa)_2$ group bonded to a particle surface of the carbon black was dispersed in water. Thereafter, sodium ions in the pigment dispersion liquid were replaced with potassium ions using an ion exchange method.

<Preparation of Liquid Containing Resin>

(Liquid Containing Resin 1)

A 4-necked flask equipped with a stirrer, a nitrogen introducing tube, a reflux condenser, and a thermometer was charged with 100.0 parts of ethylene glycol monobutyl ether. While stirring, a temperature was increased to 110° C. under a nitrogen atmosphere. A liquid obtained by mixing 39.5 parts of styrene, 40.0 parts of methyl methacrylate, and 20.5 parts of acrylic acid with each other, and 1.3 parts of a polymerization initiator were added dropwise to the flask over 3 hours. Here, the used polymerization initiator was t-butylperoxide. Then, aging was performed thereon for 2 hours, and ethylene glycol monobutyl ether was removed under reduced pressure, thereby obtaining a solid resin 1. An aqueous solution of potassium hydroxide equivalent to an acid value and an appropriate amount of ion-exchange water were added to the solid resin, and the mixture was neutralized and dissolved at a temperature of 80° C., thereby obtaining a liquid containing the resin 1 in which a content of the resin 1 was 20.0%. The resin 1 was an acrylic resin and was a random copolymer.

(Liquid Containing Resin 2)

First, 31.6 parts of polypropylene glycol having a number average molecular weight of 2,000 was dissolved in methyl ethyl ketone by stirring. Then, 46.9 parts of isophorone diisocyanate and 21.5 parts of dimethylol propionic acid were added thereto, and the mixture was reacted at 75° C. for 1 hour, thereby obtaining a prepolymer solution. The obtained prepolymer solution was cooled to a temperature of 60° C., and an aqueous solution of potassium hydroxide was added thereto to neutralize an acid group. Then, the temperature was cooled to 40° C., ion exchange water was added thereto, and the mixture was emulsified by high-speed stirring with a homomixer. After emulsification, 2.1 parts of a chain extender was added thereto, and a chain extension reaction was carried out at 30° C. for 12 hours. When the presence of an isocyanate group was not confirmed by a Fourier transform infrared spectrophotometer (FT-IR), methyl ethyl ketone was distilled off from the solution under heating and reduced pressure, thereby obtaining a liquid containing resin 2 in which a content of the resin 2 was 20.0%. The resin 2 was a urethane resin and was a random copolymer.

(Liquid Containing Resin 3)

A 4-necked flask equipped with a stirrer, a nitrogen introducing tube, a reflux condenser, and a thermometer was charged with 100.0 parts of ethylene glycol monobutyl ether. While stirring, a temperature was increased to 110° C. under a nitrogen atmosphere. A liquid obtained by mixing 80.0 parts of styrene and 20.0 parts of polyethylene glycol (20.0 mol adduct) acrylate with each other, and 1.3 parts of a polymerization initiator were added dropwise to the flask over 3 hours. Here, the used polymerization initiator was t-butylperoxide. Then, aging was performed thereon for 2 hours, and ethylene glycol monobutyl ether was removed under reduced pressure, thereby obtaining a solid resin 3. An appropriate amount of ion-exchange water was added to the solid resin 3, and the mixture was dissolved at a temperature of 80° C., thereby obtaining a liquid containing the resin 3 in which a content of the resin 3 was 20.0%. The resin 3 was a non-ionic resin and was a random copolymer.

(Liquid Containing Resin 4)

After a four-necked flask equipped with a stirrer, a nitrogen introducing tube, a reflux condenser, and a thermometer was purged with nitrogen, 100.0 parts of dimethylformamide, 0.5 parts of pentamethyldiethylenetriamine, 5.2 parts of styrene, and 0.5 mmol of chloroethyl benzene as a initiator were added thereto. When a temperature reached 80° C. by heating while stirring, 0.1 parts of copper (I) chloride was added thereto to initiate polymerization, thereby synthesizing a hydrophobic unit formed of styrene. Further, 4.3 parts of trimethylsilyl acrylic acid was added to the mixture to perform a polymerization reaction while monitoring with column chromatography, and when the polymerization reaction was completed, 2.6 parts of n-butyl acrylate was further added to perform a polymerization reaction. After the polymerization reaction was stopped, a carboxyl group of trimethylsilyl acrylic acid was hydrolyzed with sodium hydroxide and an aqueous solution of methanol to thereby be converted to a carboxylic acid. After 2.8 g of a 35.0% aqueous solution of hydrochloric acid was added to this solution, stirred at room temperature for 10 minutes, and filtered, the resultant was washed three times with pure water, thereby obtaining a solid resin 4. The obtained resin 4 was dissolved in tetrahydrofuran, and potassium hydroxide was added to the solution so that a neutralization ratio of anionic groups of the resin became 80%. Further, after an appropriate amount of ion exchange water was added thereto and stirred, tetrahydrofuran was removed under reduced pressure, thereby obtaining a liquid containing the resin 4 in which a content of the resin 4 was 20.0%.

The presence of a peak by a chemical shift of the carboxylic group and hydrolysis of the carboxylic group of trimethylsilylacrylic acid were confirmed by proton nuclear magnetic resonance spectroscopy. The resin 4 was an acrylic resin and was a block copolymer. In addition, as a result of analyzing components constituting respective blocks by proton nuclear magnetic resonance spectroscopy, the component were styrene (52.4%), acrylic acid (21.8%), and n-butyl acrylate (25.8%).

(Liquid Containing Resin 5)

A four-necked flask equipped with a stirrer, a nitrogen introducing tube, a reflux condenser, and a thermometer was charged with 0.3 parts of sodium lauryl sulfate, 20.8 parts of 2-ethylhexyl acrylate, 62.4 parts of methyl methacrylate, and 16.8 parts of methacrylic acid. To the flask, 10.0 parts of a 5% aqueous solution of potassium persulfate was added dropwise over 3 hours. Thereafter, aging was performed for 2 hours, and an appropriate amount of ion exchange water was added thereto, thereby obtaining a liquid containing a resin 5 in which a content of the resin 5 was 20.0%.

The resins 1 to 4 were water-soluble resins, and the resin 5 was a resin particle. Whether the resin is water soluble or particulate can be determined by a method described below. First, a liquid (resin solid content: 10% by mass) containing a resin neutralized by alkali (sodium hydroxide, potassium hydroxide, or the like) equivalent to an acid value is prepared. Next, the prepared liquid is diluted 10 times with pure water (based on volume), thereby preparing a sample solution. Then, when a particle having a particle diameter is not measured in the case of measuring a particle diameter of the resin in the sample solution by the dynamic light scattering method, it can be determined that the resin is water soluble. When particles having a particle diameter are measured, it can be determined that the resin is a resin particle. In this case, for example, measurement conditions can be set as follows: SetZero: 30 seconds, measurement frequency: 3 times, and measurement time: 180 seconds. In Examples, as a particle size distribution analyzer, a particle size analyzer (UPA-EX150, manufactured by Nikkiso Co., Ltd.) using a dynamic light scattering method was used.

<Preparation of Ink>

Respective components illustrated in Table 1 were mixed and sufficiently stirred. Then, the mixture was subjected pressure-filtration using a cellulose acetate filter (manufactured by Advantech Co., Ltd.) having a pore size of 1.2 μm, thereby preparing ink. Acetylenol E100 is a non-ionic surfactant manufactured by Kawaken Fine Chemicals Co., Ltd.

A numerical value attached to polyethylene glycol indicates a number average molecular weight. Relative dielectric constants of water-soluble organic solvents indicated in parentheses are values obtained at a frequency of 10 kHz using a dielectric constant meter (BI-870 manufactured by Brookhaven Instruments Corp.).

TABLE 1

Composition and Properties of Ink

| | Cyan Ink 1 | Cyan Ink 2 | Cyan Ink 3 | Cyan Ink 4 | Cyan Ink 5 | Cyan Ink 6 | Cyan Ink 7 | Magenta Ink 1 | Magenta Ink 2 | Magenta Ink 3 | Magenta Ink 4 |
|---|---|---|---|---|---|---|---|---|---|---|---|
| Pigment Dispersion Liquid 1 | | | | | | | | | | | |
| Pigment Dispersion Liquid 2 | | | | | | | | | | | |
| Pigment Dispersion Liquid 3 | | | | | | | | | | | |
| Pigment Dispersion Liquid 4 | | | | | | | | | 40.0 | 40.0 | |
| Pigment Dispersion Liquid 5 | | | | | | | | 40.0 | | | 40.0 |
| Pigment Dispersion Liquid 6 | | | | | | | | | | | |
| Pigment Dispersion Liquid 7 | | | | | | | | | | | |
| Pigment Dispersion Liquid 8 | | | | | | | | | | | |
| Pigment Dispersion Liquid 9 | | | | | | | | | | | |
| Pigment Dispersion Liquid 10 | | | | | | | | | | | |
| Pigment Dispersion Liquid 11 | | | | | | 40.0 | | | | | |
| Pigment Dispersion Liquid 12 | 40.0 | | 40.0 | 40.0 | | | | | | | |
| Pigment Dispersion Liquid 13 | | | | | 40.0 | | | | | | |
| Pigment Dispersion Liquid 14 | | 40.0 | | | | | 40.0 | | | | |
| Pigment Dispersion Liquid 15 | | | | | | | | | | | |
| Liquid Containing Resin 1 | | 5.0 | | | | | | | 2.5 | | |
| Liquid Containing Resin 2 | | | | | | | | | | | |
| Liquid Containing Resin 3 | | | | | | | | | | | |
| Liquid Containing Resin 4 | | | | | | | | | | | |
| Liquid Containing Resin 5 | | | | | | | | | | | |
| Glycerin (42.3) | 12.0 | 12.0 | | 12.0 | 12.0 | 12.0 | 12.0 | 12.0 | 12.0 | 12.0 | |
| Triethylene glycol (22.7) | 12.0 | 12.0 | | 12.0 | 12.0 | 12.0 | 12.0 | 12.0 | 12.0 | 12.0 | |
| 1,2-Hexanediol (14.8) | | | 12.0 | 12.0 | | | | | | | 12.0 |
| Polyethylene glycol 600 (11.4) | | | 12.0 | | | | | | | | 12.0 |
| Acetylenol E100 | 1.0 | 1.0 | 1.0 | 1.0 | 1.0 | 1.0 | 1.0 | 1.0 | 1.0 | 1.0 | 1.0 |
| Ion Exchange Water | 35.0 | 30.0 | 35.0 | 35.0 | 35.0 | 35.0 | 35.0 | 35.0 | 32.5 | 35.0 | 35.0 |
| Content (%) of Resin | 1.0 | 1.0 | 1.0 | 1.0 | 1.0 | 0.5 | 0.0 | 0.5 | 0.5 | 0.0 | 0.5 |

| | Magenta Ink 5 | Magenta Ink 6 | Magenta Ink 7 | Magenta Ink 8 | Magenta Ink 9 | Magenta Ink 10 | Magenta Ink 11 | Magenta Ink 12 |
|---|---|---|---|---|---|---|---|---|
| Pigment Dispersion Liquid 1 | | | | | | | | |
| Pigment Dispersion Liquid 2 | | | | | | | | |
| Pigment Dispersion Liquid 3 | | | | | | | | |
| Pigment Dispersion Liquid 4 | | | | | | 40.0 | 40.0 | 40.0 |
| Pigment Dispersion Liquid 5 | 40.0 | | | | | | | |
| Pigment Dispersion Liquid 6 | | | | | | | | |
| Pigment Dispersion Liquid 7 | | 40.0 | | | | | | |
| Pigment Dispersion Liquid 8 | | | 40.0 | | | | | |
| Pigment Dispersion Liquid 9 | | | | 40.0 | | | | |
| Pigment Dispersion Liquid 10 | | | | | 40.0 | | | |
| Pigment Dispersion Liquid 11 | | | | | | | | |
| Pigment Dispersion Liquid 12 | | | | | | | | |
| Pigment Dispersion Liquid 13 | | | | | | | | |
| Pigment Dispersion Liquid 14 | | | | | | | | |
| Pigment Dispersion Liquid 15 | | | | | | | | |
| Liquid Containing Resin 1 | | | | | | | | |
| Liquid Containing Resin 2 | | | | | | 2.5 | | |
| Liquid Containing Resin 3 | | | | | | | 2.5 | |
| Liquid Containing Resin 4 | | | | | | | | 2.5 |
| Liquid Containing Resin 5 | | | | | | | | |
| Glycerin (42.3) | | 12.0 | 12.0 | 12.0 | 12.0 | 12.0 | 12.0 | 12.0 |
| Triethylene glycol (22.7) | 12.0 | 12.0 | 12.0 | 12.0 | 12.0 | 12.0 | 12.0 | 12.0 |
| 1,2-Hexanediol (14.8) | 12.0 | | | | | | | |
| Polyethylene glycol 600 (11.4) | | | | | | | | |
| Acetylenol E100 | 1.0 | 1.0 | 1.0 | 1.0 | 1.0 | 1.0 | 1.0 | 1.0 |
| Ion Exchange Water | 35.0 | 35.0 | 35.0 | 35.0 | 35.0 | 32.5 | 32.5 | 32.5 |
| Content (%) of Resin | 0.5 | 0.5 | 0.5 | 0.5 | 0.5 | 0.5 | 0.5 | 0.5 |

TABLE 1-continued

| | Composition and Properties of Ink | | | | | |
|---|---|---|---|---|---|---|
| | Ink No. | | | | | |
| | Magenta Ink 13 | Magenta Ink 14 | Yellow Ink 1 | Yellow Ink 2 | Yellow Ink 3 | Black Ink |
| Pigment Dispersion Liquid 1 | | | 40.0 | | | |
| Pigment Dispersion Liquid 2 | | | | 40.0 | | 5.0 |
| Pigment Dispersion Liquid 3 | | | | | 40.0 | |
| Pigment Dispersion Liquid 4 | 40.0 | | | | | |
| Pigment Dispersion Liquid 5 | | | | | | |
| Pigment Dispersion Liquid 6 | | 40.0 | | | | |
| Pigment Dispersion Liquid 7 | | | | | | |
| Pigment Dispersion Liquid 8 | | | | | | |
| Pigment Dispersion Liquid 9 | | | | | | |
| Pigment Dispersion Liquid 10 | | | | | | |
| Pigment Dispersion Liquid 11 | | | | | | |
| Pigment Dispersion Liquid 12 | | | | | | |
| Pigment Dispersion Liquid 13 | | | | | | |
| Pigment Dispersion Liquid 14 | | | | | | |
| Pigment Dispersion Liquid 15 | | | | | | 35.0 |
| Liquid Containing Resin 1 | | | | | | |
| Liquid Containing Resin 2 | | | | | | |
| Liquid Containing Resin 3 | | | | | | |
| Liquid Containing Resin 4 | | | | | | |
| Liquid Containing Resin 5 | 2.5 | | | | | |
| Glycerin (42.3) | 12.0 | 12.0 | 12.0 | 12.0 | 12.0 | 12.0 |
| Triethylene glycol (22.7) | 12.0 | 12.0 | 12.0 | 12.0 | 12.0 | 12.0 |
| 1,2-Hexanediol (14.8) | | | | | | |
| Polyethylene glycol 600 (11.4) | | | | | | |
| Acetylenol E100 | 1.0 | 1.0 | 1.0 | 1.0 | 1.0 | 1.0 |
| Ion Exchange Water | 32.5 | 35.0 | 35.0 | 35.0 | 35.0 | 35.0 |
| Content (%) of Resin | 0.5 | 1.0 | 0.5 | 1.0 | 0.5 | 0.5 |

<Evaluation>

In the present invention, as the evaluation criteria for evaluation described below, "A" and "B" were set as acceptable levels, and "C" was set as unacceptable level. Evaluation results are shown in Table 3. The ink is mounted in a recording head having a single recording element substrate using an ink jet recording apparatus having the configuration illustrated in FIGS. 4A and 4B. As the recording head, recording heads 1 to 5 illustrated in Table 2 were used.

In Table 2, ejection orifice arrays of a recording element substrate correspond to the ejection orifice arrays I to IV illustrated in FIGS. 1A to 1C. In recording element substrates of the recording heads 1 to 3 and 5, the ejection orifice arrays overlap each other in a conveying direction of a recording medium, but in a recording element substrate of the recording head 4, the ejection orifice arrays do not overlap each other in the conveying direction of the recording medium. Further, the recording head 2 has the ejection orifice arrays I to III, but the ink is not ejected from the ejection orifice array II.

In the recording heads 1 to 5, the number of ejection orifices per one ejection orifice array was 1024, and a density of the ejection orifices per one ejection orifice array was 600 dpi. In addition, a long diameter ($\mu$m) passing through the center of the ejection orifice was 20 $\mu$m, and a distance (mm) between adjacent ejection orifice arrays was 0.7 mm. In addition, an ejection orifice surface of the recording head was subjected to water-repellent treatment by a condensate of a hydrolyzable silane compound having a fluoroalkyl group and a hydrolyzable silane compound having a cationic polymerizable group.

In Examples, an image recorded under a condition at which three ink droplets (5.0 ng) were applied to a unit area of 1/600 inch×1/600 inch was defined as an image with a recording duty of 100%, and a conveyance speed of the recording medium was 15 inch/second. In the case of conveying the recording medium in a direction from the ejection orifice array I to the ejection orifice array II ("I→II" in Table 3), at the time of recording the image, the recording medium is conveyed from a bottom to a top in the direction of gravity. In the case of conveying the recording medium in a direction from the ejection orifice array II to the ejection orifice array I ("II→I" in Table 3), at the time of recording the image, the recording medium is conveyed from the top to the bottom in the direction of gravity.

TABLE 2

| | Configuration of Recording Head | | | | | |
|---|---|---|---|---|---|---|
| | | Recording Head No. | | | | |
| | | 1 | 2 | 3 | 4 | 5 |
| Structure of Recording Element | Ejection Orifice Array IV | Absence | Absence | Absence | Absence | Absence |
| | Ejection Orifice | Absence | Presence | Absence | Absence | Absence |

TABLE 2-continued

| | | Configuration of Recording Head | | | | |
|---|---|---|---|---|---|---|
| | | Recording Head No. | | | | |
| | | 1 | 2 | 3 | 4 | 5 |
| Substrate | Array III Ejection Orifice Array II | Presence | Presence | Presence | Presence | Presence |
| | Ejection Orifice Array I | Presence | Presence | Presence | Presence | Presence |
| Angle (°) between Ejection Orifice Surface and Gravity Direction | | 45 | 45 | 90 | 45 | 0 |

(Color Mixing of Image)

The following evaluation was performed under a high-temperature and low-humidity environment (at a temperature of 35° C. and a relative humidity of 10%). A solid image having a plurality of colors (about 29 cm in the conveying direction of the recording medium×about 4 cm in the depth direction of the apparatus) was continuously recorded on 50 sheets using all the inks so that the recording duty of each of the inks was the same and a total recording duty of the inks was 100%, and the apparatus was allowed to stand for 1 hour. After a series of operations of continuous recording and standing for 1 hour as described above was repeated a predetermined number of times, a single color solid image (about 3 cm in the conveying direction of the recording medium×about 4 cm in the depth direction of the apparatus) having a recording duty of 100% was recorded again using each of the inks. The obtained image was used as an evaluation image. As the recording medium, plain paper (PPC paper, PB paper manufactured by Canon Inc.) was used.

The evaluation image was visually observed, thereby evaluating color mixing in the image.

A: Even though the series of operations of continuous recording and standing for 1 hour was repeated 40 times, there was no color mixing in the evaluation image.

B: Even though the series of operations of continuous recording and standing for 1 hour was repeated 20 times or more to 39 times or less, there was no color mixing in the evaluation image.

C: When the series of operations of continuous recording and standing for 1 hour was repeated less than 20 times, color mixing occurred in the evaluation image.

TABLE 3

| | Evaluation Conditions | | | | | Evaluation Result |
|---|---|---|---|---|---|---|
| | Conveying Direction of Recording Medium | Recording Head No. | Kind of Ink of Ejection Orifice Array I | Kind of Ink of Ejection Orifice Array II | Kind of Ink of Ejection Orifice Array III | Color Mixing In Image |
| Example 1 | I→II | 1 | Cyan Ink 1 | Magenta Ink 1 | — | A |
| Example 2 | I→II | 1 | Black Ink | Cyan Ink 7 | — | A |
| Example 3 | I→II | 1 | Cyan Ink 2 | Magenta Ink 2 | — | A |
| Example 4 | I→II | 1 | Magenta Ink 14 | Yellow Ink 1 | — | A |
| Example 5 | I→II | 1 | Cyan Ink 1 | Yellow Ink 1 | — | A |
| Example 6 | I→II | 5 | Cyan Ink 1 | Magenta Ink 1 | — | A |
| Example 7 | I→II | 1 | Cyan Ink 1 | Magenta Ink 3 | — | A |
| Example 8 | I→II | 1 | Cyan Ink 3 | Magenta Ink 1 | — | B |
| Example 9 | I→II | 1 | Cyan Ink 1 | Magenta Ink 4 | — | B |
| Example 10 | I→II | 1 | Cyan Ink 3 | Magenta Ink 4 | — | B |
| Example 11 | I→II | 1 | Cyan Ink 4 | Magenta Ink 5 | — | A |
| Example 12 | I→II | 1 | Magenta Ink 14 | Cyan Ink 6 | — | B |
| Example 14 | I→II | 1 | Cyan Ink 5 | Magenta Ink 1 | — | A |
| Example 15 | I→II | 1 | Cyan Ink 1 | Magenta Ink 6 | — | A |
| Example 16 | I→II | 1 | Cyan Ink 1 | Magenta Ink 7 | — | A |
| Example 17 | I→II | 1 | Cyan Ink 1 | Magenta Ink 8 | — | A |
| Example 18 | I→II | 1 | Cyan Ink 1 | Magenta Ink 9 | — | A |
| Example 19 | I→II | 1 | Yellow Ink 2 | Magenta Ink 1 | — | B |
| Example 21 | I→II | 1 | Cyan Ink 1 | Yellow Ink 3 | — | A |
| Example 22 | I→II | 1 | Cyan Ink 1 | Magenta Ink 2 | — | A |
| Example 23 | I→II | 1 | Cyan Ink 1 | Magenta Ink 10 | — | A |
| Example 24 | I→II | 1 | Cyan Ink 1 | Magenta Ink 11 | — | A |
| Example 25 | I→II | 1 | Cyan Ink 1 | Magenta Ink 12 | — | A |
| Example 26 | I→II | 1 | Cyan Ink 1 | Magenta Ink 13 | — | A |
| Example 27 | II→I | 1 | Cyan Ink 1 | Magenta Ink 1 | — | A |
| Comparative Example 1 | I→II | 5 | Cyan Ink 6 | Magenta Ink 14 | — | C |
| Comparative Example 2 | I→II | 1 | Cyan Ink 6 | Magenta Ink 14 | — | C |
| Comparative Example 3 | I→II | 1 | Magenta Ink 1 | Cyan Ink 1 | — | C |
| Comparative Example 4 | I→II | 1 | Magenta Ink 3 | Cyan Ink 1 | — | C |
| Reference Example 1 | I→II | 1 | Cyan Ink 1 | Cyan Ink 1 | — | A |
| Reference Example 2 | I→II | 2 | Cyan Ink 1 | — | Magenta Ink 1 | A |

TABLE 3-continued

Evaluation Results

| | Evaluation Conditions | | | | Evaluation |
|---|---|---|---|---|---|
| | Conveying Direction of Recording Medium | Recording Head No. | Kind of Ink of Ejection Orifice Array I | Kind of Ink of Ejection Orifice Array II | Kind of Ink of Ejection Orifice Array III | Result Color Mixing In Image |
| Reference Example 3 | I→II | 3 | Cyan Ink 1 | Magenta Ink 1 | — | A |
| Reference Example 4 | I→II | 3 | Cyan Ink 6 | Magenta Ink 14 | — | A |
| Reference Example 5 | I→II | 1 | Cyan Ink 7 | Magenta Ink 3 | — | A |
| Reference Example 6 | I→II | 4 | Cyan Ink 1 | Magenta Ink 1 | — | A |
| Reference Example 7 | I→II | 4 | Cyan Ink 6 | Magenta Ink 14 | — | A |

As Reference Example 8, an image was recorded using an ink jet recording apparatus sequentially including two recording heads corresponding to magenta ink 1 and cyan ink 1 from an upstream side in the conveying direction of the recording medium. As a result of recording the image using the same method as in Comparative Example 3 except for using two recording heads, color mixing in the image was evaluated as A corresponding to the acceptable level.

As Reference Example 9, an image was recorded using an ink jet recording apparatus sequentially including two recording heads corresponding to cyan ink 1 and magenta ink 1 from the upstream side in the conveying direction of the recording medium. As a result of recording the image using the same method as in Example 1 except for using two recording heads, color mixing in the image was evaluated as A corresponding to the acceptable level.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-201262, filed Oct. 17, 2017, and Japanese Patent Application No. 2018-180353, filed Sep. 26, 2018, which are hereby incorporated by reference herein in their entirety.

What is claimed is:

1. An ink jet recording method using an ink jet recording apparatus that includes (i) first and second inks corresponding to aqueous inks that each comprises a coloring material, and (ii) a recording head having an ejection orifice surface in which a first ejection orifice array for ejecting the first ink and a second ejection orifice array for ejecting the second ink are formed, the first and second ejection orifice arrays being sequentially arranged from the bottom up in the direction opposite to the direction of gravity to be adjacent to each other and at least partially overlap each other in a conveying direction of a recording medium, the ink jet recording method comprising:
ejecting an aqueous ink from the recording head disposed so that an angle formed between the ejection orifice surface of the recording head and the direction of gravity is 0° or more to less than 90° to record an image on the recording medium, wherein the ejection orifice surface is parallel to the direction of gravity when the angle is 0°,
wherein at least one of the first and second inks comprises a resin, and
wherein a content of the resin in the second ink is smaller than a content of the resin in the first ink.

2. The ink jet recording method according to claim 1, wherein the ink comprising the resin comprises a first water-soluble organic solvent having a relative dielectric constant of 20.0 or more.

3. The ink jet recording method according to claim 1, wherein the first ink is cyan ink and the coloring material is at least one selected from the group consisting of C.I. pigment blue 15:3 and C.I. pigment blue 15:4, and
wherein the second ink is magenta ink and the coloring material is at least one selected from the group consisting of C.I. pigment violet 19, C.I. pigment red 122, C.I. pigment red 202, and C.I. pigment red 209.

4. The ink jet recording method according to claim 1, wherein the first ink is magenta ink and the coloring material is at least one pigment selected from the group consisting of C.I. pigment violet 19, C.I. pigment red 122, C.I. pigment red 202, and C.I. pigment red 209 or a solid solution formed from two or more of the pigments, and
wherein the second ink is yellow ink and the coloring material is at least one selected from the group consisting of C.I. pigment yellow 74 and C.I. pigment yellow 155.

5. The ink jet recording method according to claim 1, wherein the first ink is cyan ink and the coloring material is at least one selected from the group consisting of C.I. pigment blue 15:3 and C.I. pigment blue 15:4, and
wherein the second ink is yellow ink and the coloring material is at least one selected from the group consisting of C.I. pigment yellow 74 and C.I. pigment yellow 155.

6. The ink jet recording method according to claim 1, wherein the recording head includes a single recording element substrate in which the first and second ejection orifice arrays are arranged.

7. The ink jet recording method according to claim 6, wherein the recording head includes a plurality of recording element substrates.

8. The ink jet recording method according to claim 7, wherein the plurality of recording element substrates is arranged to be adjacent to each other in an arrangement direction of the first ejection orifice array and the second ejection orifice array.

9. An ink jet recording apparatus comprising:
(a) first and second inks corresponding to aqueous inks that each comprises a coloring material; and
(b) a recording head having an ejection orifice surface in which a first ejection orifice array for ejecting the first ink and a second ejection orifice array for ejecting the second ink are formed, the first and second ejection orifice arrays being sequentially arranged from the bottom up in the direction opposite to the direction of gravity to be adjacent to each other and at least partially overlap each other in a conveying direction of a recording medium, wherein an image is recorded on the recording medium by ejecting an aqueous ink from the recording head that is disposed so that an angle formed between the ejection orifice surface of the recording head and the direction of gravity is 0° or more to less than 90°, wherein the ejection orifice surface is parallel to the direction of gravity when the angle is 0°, wherein at least one of the first and second inks comprises a resin, and wherein a content of the resin in the second ink is smaller than a content of the resin in the first ink.

10. The ink jet recording method according to claim 1, wherein an angle formed between the ejection orifice surface of the recording head and the direction of gravity is 10° or more to 80° or less.

11. The ink jet recording method according to claim 1, wherein an angle formed between the ejection orifice surface of the recording head and the direction of gravity is 30° or more to 60° or less.

12. The ink jet recording method according to claim 1, wherein the conveying direction of the recording medium is from the first ejection orifice array to the second ejection orifice array.

13. The ink jet recording method according to claim 1, wherein the ejection orifice surface is subjected to a water-repellent treatment.

14. The ink jet recording method according to claim 1, wherein the resin comprises an acrylic resin.

\* \* \* \* \*